US006878355B1

(12) United States Patent
Bugnet et al.

(10) Patent No.: US 6,878,355 B1
(45) Date of Patent: Apr. 12, 2005

(54) DEVICE FOR ACTIVATING CONDUCTIVITY IN POROUS STRUCTURES

(75) Inventors: Bernard Bugnet, Le Plessis-Trevise (FR); Jacques Doniat, Vincennes (FR); Robert Rouget, Paris (FR)

(73) Assignee: S.C.P.S. Societe de Conseil et de Prospective Scientifique S.A., Rosny-sous-Bois (FR)

( * ) Notice: Subject to any disclaimer, the term of this patent is extended or adjusted under 35 U.S.C. 154(b) by 769 days.

(21) Appl. No.: 09/685,780

(22) Filed: Oct. 10, 2000

Related U.S. Application Data

(63) Continuation of application No. PCT/IB99/00618, filed on Apr. 8, 1999.

(30) Foreign Application Priority Data

Apr. 10, 1998 (FR) ........................................... 98 04547

(51) Int. Cl.[7] .................................................. B01J 8/02

(52) U.S. Cl. ......................... 422/211; 144/50; 118/621; 118/400; 118/429; 118/416

(58) Field of Search ........................... 144/50; 118/621, 118/400, 429, 416; 422/211

(56) References Cited

U.S. PATENT DOCUMENTS

| | | | | | |
|---|---|---|---|---|---|
| 1,729,057 | A | * | 9/1929 | Texler | 118/50 |
| 3,693,587 | A | * | 9/1972 | Anderson | 118/304 |
| 4,722,295 | A | * | 2/1988 | Young | 118/416 |
| 4,882,232 | A | * | 11/1989 | Bugnet et al. | 428/613 |
| 5,146,958 | A | * | 9/1992 | Bugnet et al. | 141/1.1 |
| 5,183,552 | A | | 2/1993 | Gedrat et al. | |
| 5,523,119 | A | | 6/1996 | Wettermark et al. | |
| 5,591,482 | A | | 1/1997 | He et al. | |
| 5,683,744 | A | * | 11/1997 | Jolly et al. | 427/121 |
| 5,690,741 | A | * | 11/1997 | Durr et al. | 118/404 |
| 5,902,402 | A | * | 5/1999 | Durst et al. | 118/423 |
| 6,290,832 | B1 | * | 9/2001 | Bugnet et al. | 205/161 |

* cited by examiner

*Primary Examiner*—Glenn Caldarola
*Assistant Examiner*—Alexis Wachtel
(74) *Attorney, Agent, or Firm*—Sturm & Fix LLP

(57) ABSTRACT

The invention concerns the treatment of porous structures such as cross-linked foams, woven or nonwoven, to make them electrically conductive by depositing polymers. The device enables, in a chemical reactor, to perform the activating treatment directly through non-reeled off blocks or rolls of porous structures, the treating fluids of the successive steps being made to circulate inside said blocks or rolls, via a perforated rotary mandrel whereon they are pressed. Said device enables to activate efficiently the structures, which may be metal-coated or not, and are particularly designed to be used as electrodes for liquid effluent electrolysis, of detectors and traps of organic or biological molecules, electrode supports for electrochemical generators, catalyst supports, filtering media, acoustic insulants, electromagnetic, nuclear and antistatic protection structures, heat exchangers and the like.

9 Claims, 3 Drawing Sheets

DEVICE FOR ACTIVATING CONDUCTIVITY IN POROUS STRUCTURES

This application is a continuation of PCT/1B99/00618 filed Apr. 8, 1999.

The invention relates generally to the field of treating porous structures to render them electrically conductive.

The invention relates more particularly to the field of preparing complex and highly porous structures, possibly made of metal or metal-plated, for use as electrodes for electrolysing liquid effluents, for detecting and trapping organic or biological molecules, as electrode supports for storage cells, as supports for catalysts, filter media, acoustic insulation, electromagnetic and nuclear protection structures and antistatic structures, heat exchangers, etc.

The structures according to the invention are foam, felt or woven structures with a high content of open pores, giving the appearance of a dense network of fibres or meshes with a three-dimensional framework, defining a plurality of open spaces communicating with each other and with the exterior of the structure.

Foams are highly porous cross-linked open-pore cellular structures in which the all the meshes of the network or at least a large proportion of them communicate with each other. Their porosity exceeds 80% and can be as high as approximately 98%.

Felts are random interleavings of non-woven fibres (although most of the fibres are located substantially in the plane of the resulting "nap"). Intercommunicating spaces of varying shape and size are defined between the fibres, which are optionally bonded by a binding agent.

Woven materials are structures made by interleaving (weaving or knitting) textile fibres or filaments. They can take the form of thick and complex structures, in particular if they have two woven outside faces connected by knitted together filaments which hold them apart and simultaneously interconnect them, for example materials of the kind made on Raschel weaving looms.

The various complex porous structures can be made from various basic materials, and in accordance with the invention may be intended to be metal-plated throughout their thickness, over the whole of their developed surface, without blocking their pores.

Foams are made from organic or mineral, natural or synthetic materials, and in particular polymers such as polyamide, polyurethane (polyester or polyether) or polypropylene.

Felts and woven materials are also made from organic or mineral materials, such as the polymers previously cited, glass fibres, mineral wool fibres or carbon fibres, or natural fibres such as cotton, wool or the like.

Various activation processes to enable electroplating of such structures have already been proposed, including:

- chemical deposition of metal, followed by one or more electrochemical deposition stages,
- deposition of carbon or graphite particles, in particular in the form of conductive paint or lacquer, followed by one or more electrochemical deposition stages,
- deposition of a metal in a vacuum, in particular by cathode sputtering, gaseous diffusion or ionic deposition, followed by one or more electrochemical deposition stages,
- deposition by thermal decomposition of a metallic substance or salt in the vapour phase, and
- chemical deposition of conductive polymer, followed by one or more stages of electrochemical deposition of metal.

In all cases where the intention is to carry out one or more electrochemical deposition stages, it is necessary to render the surface to be electroplated electrically conductive beforehand. This is the function of the "conductive activation" step which is included in most of the processes cited (chemical deposition of metal or polymers, deposition of carbon particles, deposition in a vacuum).

The activation methods for subsequent implementation of one more electroplating stages described hereinabove and used industrially until now have not been applied to complex porous structures except for a treatment in the form of thin (thickness of the order of one millimeter) sheets (or strips), which have had to be conveyed and drawn through one or more treatment tanks (chemical baths, carbon lacquer baths, vacuum deposition enclosures). This has been one of the major limitations of such processes from both the technical and economic points of view.

Thus only complex porous structures in thin layers (sheets or strips) have been activated industrially in the past. With the exception of chemical deposition processes, the thin layers are limited to thicknesses of the order of one millimeter or a few millimeters, depending on the porosity of the treated product, the dimensions of its pores or interstices, and the penetration power of the activation process.

Accordingly, foams of the so-called "100 ppl" (100 pores per linear inch) grade, i.e. having approximately 40 pores per linear centimeter at the surface, cannot be satisfactorily activated industrially other than in thicknesses less than approximately 5 millimeters when using vacuum deposition or thicknesses less than approximately 3 millimeters when depositing carbon or graphite powder.

French patent application number 98.03375, whose title in translation is "Thick complex porous structures rendered electrically conductive, and corresponding conductive activation method", represented a considerable step forward in the field of conductive activation methods. It covers the first activation method enabling treatment throughout their volume of complex porous structures having varied thicknesses and shapes, in particular blocks or rolls, without requiring any unrolling operation. This constituted a real breakthrough compared with all previous practises. The method adopts the principle of chemical deposition of a conductive polymer.

Here, and hereinafter, the term "roll" refers to a cylinder formed by rolling a porous structure strip.

The subject matter of the present invention is a device designed for practical use of the method described in the document 98.03375 mentioned above.

The device according to the invention is especially intended for treating rolls and blocks of cross-linked foam and rolls of woven and non-woven material.

Using the method described in the document 98.03375, the treatment solutions are passed through the structure, rather than the structure having to be passed successively through the various baths of a conventional production line.

The conductive activation treatment therefore works by completely impregnating the porous structure block or roll to be treated with the various solutions injected into the mass of the porous structure and used for:

- preparatory pre-treatment of the porous structure, in particular by oxidation,
- deposition or fixation of monomer,
- oxidation leading to polymerisation and simultaneously to doping of the monomer.

The intermediate draining, rinsing and drying steps are also applied throughout the block or the whole roll, without unrolling it.

A typical sequence of activation treatment steps is as follows:

a) preparatory pre-treatment of the surface of the basic structure, b) rinsing, possibly followed by draining and drying, c) depositing a monomer, d) draining, e) polymerising the monomer by oxidation-doping to yield an electrically conductive polymer, f) rinsing and draining, and g) optional drying.

The above steps are carried out one after the other throughout the volume of the structure to be treated.

The preparatory pre-treatment can naturally vary with the material of which the structure is formed, its density, the type of porous structure treated and the nature of the monomer to be deposited.

When conductive activation using polypyrrole on polyurethane foam is required, for example, it is advantageous, before depositing the corresponding monomer (the pyrrole) to carry out an oxidising pre-treatment of the surface of the meshes to the structure, which in principle is comparable with the etching process used in the textile industry.

To facilitate the description, the device in accordance with the invention is described hereinafter with reference to figures provided by way of illustration of the possibilities of implementation of said device, without the invention being limited or restricted in any way by the configurations put forward by way of example.

Figure 1:
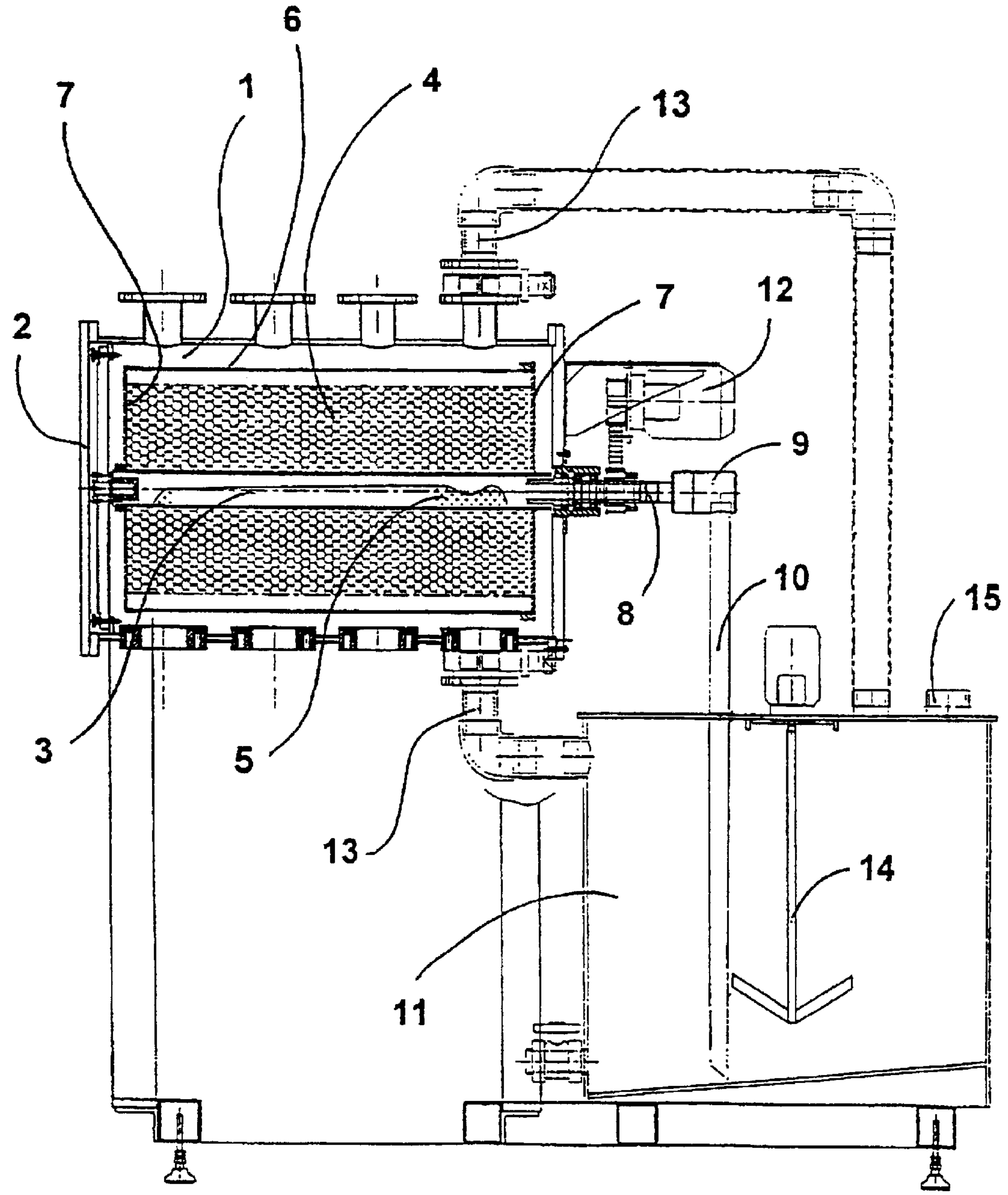
FIG. 1 is a partial profile view of a device according to the invention including a reactor.

According to the present invention, the processing installation is organised around a chemical reactor (1) into which the porous structure that is to be rendered electrically conductive is inserted through a door (2).

The structure to be treated takes the form of a roll or spool formed by rolling a strip of cross-linked foam, felt or woven material on itself, or the form of a block of cross-linked foam. Although the conventional general shape of rolls or spools is substantially cylindrical, the blocks can be various shapes, depending in particular on the shapes required after activation or possibly after metal-plating. The blocks treated are nevertheless usually substantially cylindrical, although the invention is not limited to this. The main form of shaping used afterwards is to cut the block into strips of varied thickness, which operation can be easily effected by peeling a cylindrical block as it is rotated about its axis.

The blocks or rolls (4) are prepared so that they have a hollow central axis or hub passing completely through them into which is inserted a core (3) which is an integral part of the reactor.

The core, which is optionally removable, is perforated with holes (5) over the portion of its surface intended to be in contact with the porous structure block or roll. It fulfils or can fulfil several functions in the processing device:

fixing the roll or block in the reactor, support shaft on which the block or roll rotates, passage for injecting treatment solutions, and passage for aspirating treatment solutions.

The porous structure rolls or blocks to be activated are inserted into the reactor around the core, as shown in FIG. 1. They can be held in a complementary manner by a rack (6) placed around the block or roll and substantially adopting its outside shape, as well as by flanges (7) which also fasten together the rack (6) and the core (3).

In the case of cylindrical rolls or blocks, the rack (6) itself takes the form of a hollow tube or cylinder within which the porous structure (4) to be treated is placed and which fits over the core. The rack (6) is advantageously made of perforated sheetmetal, expanded metal or a grid. The end flanges (7) of the rack (6) can be perforated or solid.

The core (3) is connected at one end at least to a hollow shaft (8) by means of which an injection and/or aspiration pump (9) circulates the treatment solutions. The pump connects the shaft (8) and the core (3) to pipes (10) leading to treatment solution storage tanks (11).

The shaft (8) can be rotated by a motor (12). When the motor (12) rotates the shaft (8), the shaft drives the core (3) and the block or roll (4). Depending on the treatment steps, it may or may not be advantageous to use such rotation, the speed of which can be varied over a wide range.

The wall of the reactor (1) is provided with treatment solution supply and/or evacuation pipes (13).

According to the invention, the solutions or some of the solutions can be injected via the core (3) and returned to their respective storage tanks (11) via the pipes (13), or the converse arrangement can be adopted, i.e. injecting them via the pipes (13) and recovering them, by means of pumps, through the core (3) and then the shaft (8), the pump (9) and the pipes (10).

It is equally possible, during the same treatment step, to reverse once or more times the directions in which the solutions are injected/recovered, in order to encourage as homogeneous as possible a distribution of said solutions within the block or roll to be treated at all points in the structure.

In a preferred embodiment of the device according to the invention the fluids are introduced through the block or roll (4) by way of the perforated core (3). The pipes (13) return the solutions to the tanks (11). During the phases of treatment by diffusing solution through the structure to be treated, the pipes (13) in the top part of the reactor (1) are kept open to enable overflow evacuation and the pipes (13) connected to the bottom part of the reactor are closed by a valve or a solenoid valve so that the reactor fills with solution and the block or roll (4) is mostly or totally immersed.

In a preferred embodiment of the device according to the invention it is advantageous for the block or roll to be rotated at a moderate speed during the various treatment phases of the porous structures, to contribute to optimum diffusion of the fluid through it.

The device according to the invention is designed for optimum implementation of the conductive activation process by depositing conductive polymer described in the document 98.03375.

To this end, it is especially intended to provide the following operating characteristics:

great homogeneity of treatment during each of the main steps (preparatory pre-treatment of the surfaces, depositing or fixing a monomer, polymerising the monomer by oxidation-doping), by diffusion of solutions through the entire mass of the structure to be treated, in contact with all points of its developed surface;

effective elimination and recovery of the treatment solutions to minimise the consumption of active products and to avoid obstructing the structure and the risk of it becoming clogged;

effective rinsing throughout the porous structure to be activated;

separating solutions which must not mix;

supporting the blocks or rolls to limit or prevent deformation during the steps of the process;

a compact reactor, to limit the volumes of treatment solutions;

simple operation, simple maintenance and the facility for automation;

the facility for drying the porous structure;

compact implementation and economic design of the device as a whole; and rapid chaining of operations, in order to achieve a complete treatment cycle in the shortest possible time, for reasons of economy when the process is implemented on an industrial scale.

To meet these multiple constraints, the device according to the invention provides varied responses and great flexibility of use, as we have already taken pains to demonstrate. Further comments show this in more detail.

For successful conductive activation of the porous structures it is essential that all of their developed surface is treated with each of the solutions.

To this end, and as indicated above, the solutions are injected through the block or roll, from its inside towards its outside, and/or vice-versa, according to the direction adopted for the flow of the fluids. It is advantageous to rotate the block or roll—especially if injection is effected from the core—for example at a speed of approximately 60 rpm, so that the resulting centrifugal force is added to the force with which the liquid is injected on leaving the core and contributes to fast diffusion through the block or roll. Rotation about a horizontal axis maintains a homogeneous diffusion, which otherwise might not be achieved with an immobile block or roll, because of the force of gravity, the effect of which would be aggravated by the head loss within the porous structure.

The advantage of rotation is particularly marked at the start of the solution injection phase, when the reactor has not been entirely filled with said solution.

It has already been stated that it is important to eliminate the treatment solutions effectively from the structure and to recover them in order to minimise the consumption of active products and to avoid obstructing the structure and the risk of it becoming clogged.

When a treatment step is finished, the reactor must be drained and the solution returned to its storage tank.

In a preferred embodiment of the device according to the invention the reactor is drained via the pipes (13) opening onto the bottom of the reactor, or to be more precise by the pipe which connects the bottom of the reactor to the storage tank specific to the solution that has just been used. Draining can be by gravity alone, or forced by means of a pump, not shown in FIGS. 1 and 2, which pump is preferably specific to each drainage circuit and therefore to each storage tank.

To facilitate complete draining of the reactor, and therefore good recovery of the solutions and minimum mixing of successive solutions, it is advantageous for the reactor bottom not to be horizontal, but instead inclined or concave on the inside, and to position the openings of the bottom pipes (13) on a line linking the lowest points of the reactor. In particular it is possible and advantageous to make a cylindrical reactor with the plane end walls vertical. The axis of the cylindrical reactor is then horizontal and materialised by the core (3), as shown in FIG. 1.

Draining the reactor also entails eliminating the portion of the solution that filled the free space within the porous structure to be treated. It has already been pointed out that these structures can be very porous in the case of cross-linked foams or some complex woven materials (approximately 98% porosity for foams of the so-called "100 ppl" (100 pores per linear inch) grade, i.e. foams having approximately 40 pores per linear centimeter at the surface); foams of this kind have a high capacity to retain liquids.

In the context of the present invention, it is conceivable to compress the porous structures, and in particular the foams, in the same way as a sponge is compressed to squeeze out liquids that it contains. The rack (6) and/or the flanges (7) can be designed to allow this; in particular they can be articulated and compress the block or roll to wring it out before returning to their normal position.

However, there are polyurethane foams that are deformed when they emerge from any such operation. What is more, very fast draining of the reactor, which leaves a porous structure, in particular a foam, largely filled with solution, can also deform the structure if it cannot support the weight of liquids inside it without "collapsing".

For structures of the above kind, the device according to the invention provides a satisfactory response to these constraints, by draining the reactor "slowly", so that the porous structure does not have to support its own volume of liquid, and so that the liquid level drops virtually homogeneously in the reactor around and within the porous structure block or roll. When the general level of the liquid in the reactor reaches the point where the block or roll has emerged totally from the liquid, the structure has largely been drained of solution by the effect of gravity. A limited quantity of liquid remains in the structure, largely retained by the capillary effect.

This residual quantity can advantageously be eliminated by centrifuging the block or roll, the core being rotated by the motor (12). Again with the aim of avoiding deformation of the structure, it would appear beneficial to run up to the final rotation speed progressively as the solution is centrifugally expelled from the structure. Excellent elimination of the residual solution contained in the block or roll can be obtained in a few tens of seconds or a few minutes, depending on the density of the structure, the thickness of the block or roll and the rotation speed.

For cross-linked foam structures, which are generally more sensitive to the risk of deformation than woven and non-woven materials, the rotation speed can advantageously be limited to a figure of the order of 200 to 300 rpm. The rotation speed can be greater than 500 or 1 000 rpm with stronger structures, and in particular felts.

The solutions centrifugally expelled from the block or roll impinge on the walls of the reactor and are recovered in the drainage pipe (13) leading to the corresponding storage tank.

In a variant of the device according to the invention, in order to accelerate centrifugal recovery on the walls of the reactor, the reactor can be vertical, in which case the core (3) is itself vertical.

The reactor can be positioned in this way either permanently or only during centrifuging. In the latter case, the axis of the reactor can then be tilted between the horizontal and the vertical on a chassis enabling it to pivot. A variant of this kind, although it complicates the construction of the device, can be beneficial in that it reduces the duration of the operating cycle and avoids the risks of heterogeneous treatment, which risks can arise in the case of an axis that is permanently vertical (with the possibility of uneven treatment between the top and bottom parts of the block or roll).

Exactly as when eliminating or recovering active treatment solutions, the required rinsing operations must be carried out under optimum conditions.

The theoretical configuration of the device according to the invention enables cleaning and rinsing, whether with mains water, demineralised water or any suitable solution, by injection and evacuation in the manner described for the active treatment solutions. In particular, it is possible to rinse or even to clean the structure before carrying out the cycle of operations described in the document 98.03375, which can eliminate from polyurethane foams, for example, manufacturing impurities, polymerisation catalysts, cutting greases, etc, and more generally any unwanted residual solid or liquid volatile products.

It is also possible, in the context of the present invention, to use the circuit for injecting and evacuating the fluids to blow treatment gases or gas mixtures through the block or roll. This can apply to air in particular, to complete the elimination of all traces of liquid within the structure. The air or gas blown through the circuit can advantageously be heated to a temperature that is not harmful to the basic structure, the treatment or the products deposited, and generally to a temperature of a few tens of degrees Celsius, to help rapid drying of the structure.

Due to the effect of the various treatment solutions, and in particular some solutions for depositing or fixing monomers, and the intermediate steps of evacuating fluids, some porous structures to be activated can show a natural tendency to deform. This can be the case with cross-linked polyurethane foams. The device according to the present invention solves this potential problem: supporting the block or roll is then of great importance. The rack (6) and the flanges (7) are designed to fulfil this function.

In the case of conductive activation of rolls of woven or non-woven material, the rack can advantageously be adapted to surround the structure to be treated closely, without compressing it. For treating polyurethane foams it can be advantageous to proceed otherwise. The step of depositing a monomer, especially pyrrole, can soften the structure and swell its meshes. The block or roll then expands in three dimensions at this stage, and can suffer irregular deformations, as referred to above.

External expansion of the block or roll can be prevented by means of racks and flanges, but this is not always an optimum solution because, even if the deformation is contained within the original volume, it can nevertheless occur inside it, risking the production of structural irregularities (differential density and porosity) and "crumpling" of the meshes of the pores. The foam can then lose its isotropic character and/or some of its mechanical characteristics.

The device according to the invention proposes to solve this problem not by preventing but by absorbing the increase in the volume of the blocks or rolls of cross-linked foam that are susceptible to swelling.

This action can be carried out within the reactor by using a rack (6) whose inside diameter is slightly greater than the outside diameter of the block or roll; the intermediate space is then filled with a structure which is porous but compressible, which will partly contain and homogenise the swelling of the treated product. It must be porous, for the same reason that the rack is perforated, i.e. in order not to increase significantly the head losses of the fluids between the centre and the walls of the reactor (and vice-versa). It must be compressible, and must not swell during treatment, like the structure to be activated, in order to be able to absorb, and therefore limit, the increase in volume of the block or roll. The material used to fulfil this "buffer mattress" function can have a cross-linked cellular structure that is inert or virtually inert to the global conductive polymer deposition process and is not subject to swelling during the cycle of operations.

Some porous structure blocks or rolls to be activated which are susceptible to swelling can be slightly marked on their outside surface with an impression of the inside surface of the rack (reflecting the shapes of the perforations, the expanded metal or grid, etc), especially during centrifuging. A flexible "buffer mattress" advantageously avoids this risk.

Similarly, "buffer mattresses" can be used between the block or roll and the flanges (7).

The device according to the invention is intended for the industrial application of chemical processes for depositing polymers, and in particular conductive polymers such as polypyrrole, by the method described in the document 98.03375.

This type of cycle of operations uses active treatment solutions containing reagents and the quantities of the solutions used must be minimised, for obvious reasons of process economy.

To meet this objective, the device according to the invention includes a reactor whose shape and dimensions are preferably matched to those of the blocks and rolls to be treated, so that the interior volume of said reactor is only slightly greater than the volume defined by the rack (6) and the flanges (7). Accordingly, it is usually advantageous for the reactor to be substantially cylindrical and to have an inside diameter approximately 4 to 10 centimeters greater than the outside diameter of the rack (6).

The device according to the invention can be made in various sizes, from a laboratory pilot scale to high-capacity industrial plant. The various embodiments can be controlled manually or the cycle of operations can be partly or totally automated.

It is designed for great simplicity of operation and maintenance in all types of application, and particularly for mass production.

Accordingly, the materials from which the reactor is made are preferably chosen so as not to react on contact with the treatment solutions. The materials must therefore not be sensitive to the initial step of oxidising pre-treatment of the structure, with no or little setting on deposition of monomer, and must resist the oxidising solution for polymerising the monomer.

By way of non-limiting examples of the invention, mention may be made of the use of the "Uranus B6" and "Hastalloy" alloys, which have good resistance to attack by the monomer oxidising solution, and high-density polyethylene, PVDF and PTFE, which are relatively insensitive during the oxidising pre-treatment to the fixing of manganese dioxide and consequently to the deposition of monomer. This avoids premature wear of the equipment, wastage of active materials and penalising cleaning operations.

Without departing from the scope of the present invention, the device can include, as ancillaries of the reactor, treatment solution storage tanks (10), possibly fitted with stirrers (14), temperature regulators, vents (15) and equipment for continuously or intermittently metering and/or adjusting the concentrations of the solutions.

Also without departing from the scope of the invention, the same treatment installation can use, instead of a single reactor in which all the steps of the activation treatment are carried out, a plurality of reactors dedicated to one or more treatment steps.

Figure 3:
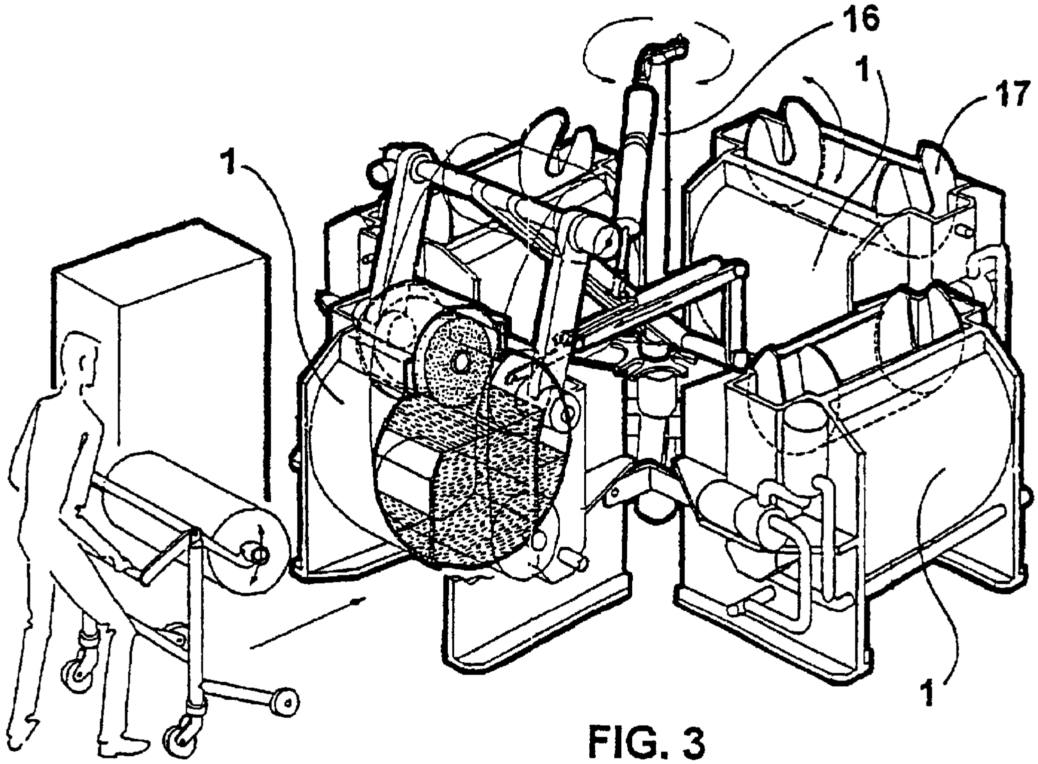
FIG. 3 is a perspective view of an arrangement according to the invention including a plurality of reactors.

A non-limiting example of one arrangement in accordance with the invention of this kind is shown in FIG. 3, and in particular:

for each reactor and its components, it limits the constraints concerning the nature of the materials from which it is made to those specific to the single step concerned; and it increases the productivity of the equipment, each reactor being immobilised by the same block or roll for only the duration of one step, and not for the entire cycle, so that it is possible to process several blocks and/or rolls simultaneously, each being at a different stage of the complete cycle at a given time.

A system of the above kind can be automated by means of a mechanism (16) for transferring the blocks or rolls, placed between the reactors, as shown in FIG. 3, or adapted to transfer the blocks or rolls from one reactor to another, the reactors being placed in a row.

FIG. 3 shows a particular type of door or cap (2) which is advantageously designed for robot manipulation of the blocks or rolls: the caps are rotary caps at the top of the reactor and can also integrate members (17) which attach to the core carrying the block or roll.

By way of non-limiting illustration of the invention, there are described hereinafter operating characteristics that have been obtained with semi-industrial treatment equipment.

Figure 2:
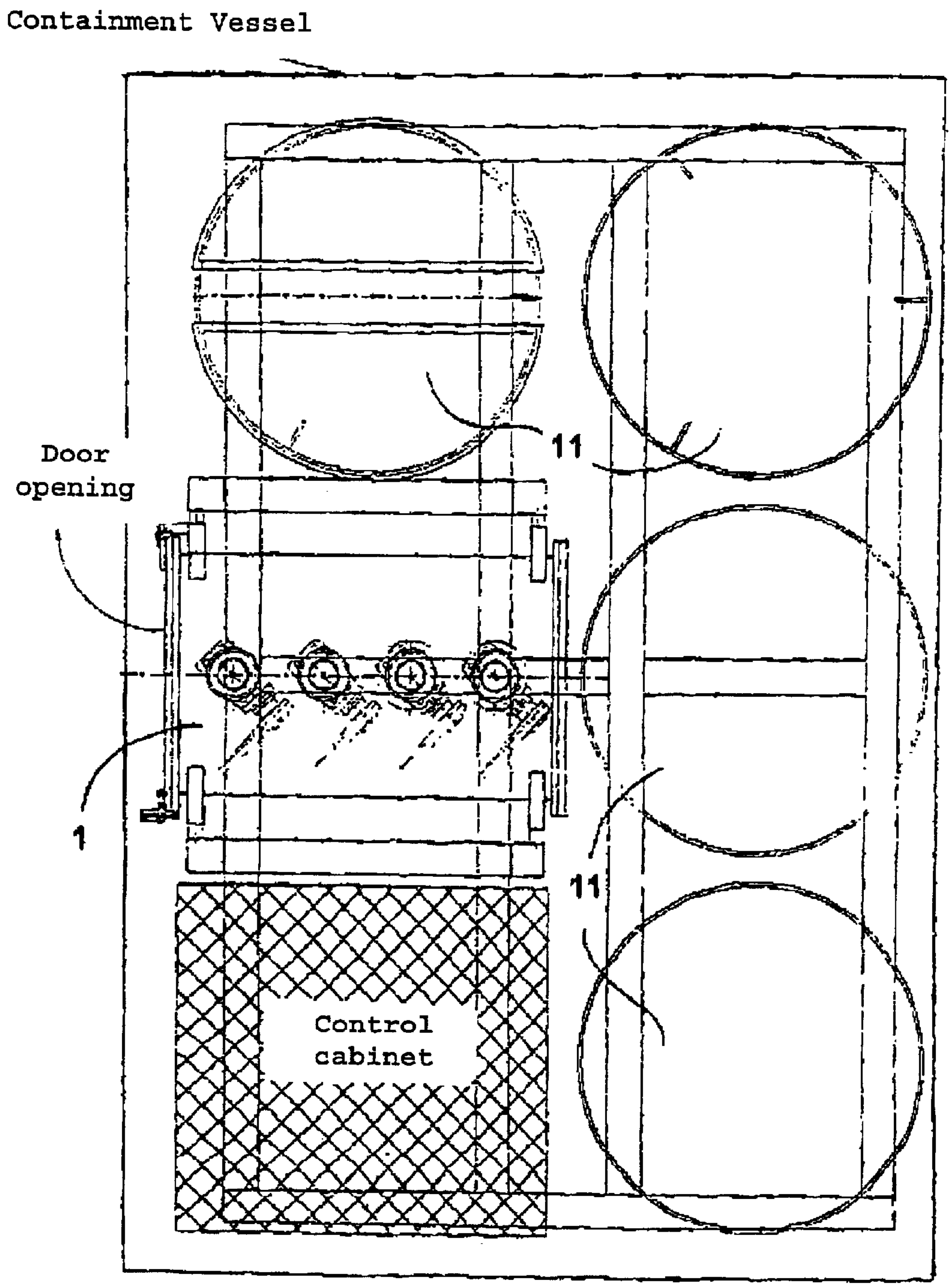
FIG. 2 is a view from above showing the layout of the various main components of the device.

Said equipment corresponded to the type of arrangement shown in FIGS. 1 and 2.

The reactor, made from "Uranus B6" alloy, had an inside length of 1 200 mm and an inside diameter of 700 mm. The outside diameter of the rack (6) was 620 mm and its thickness was 5 mm.

The block or roll to be treated was a cylinder 1 000 mm long with an outside diameter of 500 mm.

Trials were conducted on blocks and rolls of polyurethane foam of the "ppl 100" grade (having approximately 40 pores per linear centimeter).

Conductive activation was effected by depositing polypyrrole.

The cycle of operations was as follows:

| Step | Duration |
|---|---|
| 1 - Loading the structure to be treated | 05 minutes |
| 2 - Oxidising pre-treatment | 13 minutes |
| 3 - Draining and centrifuging | 05 minutes |
| 4 - Rinsing and centrifuging | 08 minutes |
| 5 - Depositing/fixing the monomer | 08 minutes |
| 6 - Draining and centrifuging | 05 minutes |
| 7 - Polymerisation by oxidation-doping | 15 minutes |
| 8 - Draining and centrifuging | 10 minutes |
| 9 - Rinsing and centrifuging | 08 minutes |
| 10 - Drying | 05 minutes |
| 11 - Offloading and cleaning | 10 minutes |
| Total cycle time: | 92 minutes |

The oxidising pre-treatment was carried out using an aqueous solution of potassium permanganate, the monomer was precipitated in a solution of pyrrole in a mixture of water and potash, and oxidation-doping was carried out using an aqueous solution of ferric chloride and fluoboric acid.

The treated rolls consisted of a strip 1.7 mm thick and 10 meters long. They therefore had an apparent surface area of structure to be activated of 100 square meters. After activation, the strip could be paid out without difficulty, i.e. without significant problems of adhesion between the contacting surfaces of the rolled strip. The conductive polymer deposited, which was polypyrrole, had imparted to all points of the strip an electrical conductivity less than 30 ohms-square.

The treated blocks were peeled to obtain strips with a final thickness of 1.7 mm, the electrical conductivity of which at all points was also less than 30 ohms-square.

Conductive activation effected directly on blocks of foam is naturally followed by peeling the block to obtain strips, or by any other form of cutting. This enables accurate cutting to a required thickness.

In the case of rolls, as in the case of blocks, conductive activation was obtained throughout the thickness of the porous structures, on the surface of every mesh, by a continuous deposit of a conductive polymer over the whole of the developed surface, without clogging the pores.

Similar results were also obtained throughout rolls of various woven and non-woven materials activated by continuous deposition of a conductive polymer on the surface of each fibre or filament, without clogging the pores.

Devices according to the invention can be made larger or smaller than indicated hereinabove. For example, it is possible to make reactors for treating blocks or rolls 2 meters long and 1 meter in diameter.

Naturally, and as is clear in any event from the foregoing description, the invention is not limited to the particular embodiments which have been described by way of example.

The invention is not limited to the examples given, but encompasses all variants thereof.

What is claimed is:

1. A chemical device for depositing conductive polymer on complex porous cross-linked foam, felt or woven material structures to impart electrical conductivity to said structures, characterized in that it includes one or more reactors in which the various conductive activation treatment steps are effected within said structures, throughout the thickness thereof, on the surface of each of their fibres or meshes, without clogging their pores, to impart to them a continuous electrical conductivity over the whole of their developed surface, and in that it enables treatment of structures of varying thicknesses and shapes, in particular in the form of blocks or rolls (cylinders formed by a rolled strip), throughout their volumes, and without unrolling them in the case of rolls, the various treatment solutions being passed through said blocks or rolls, the device including at least one reactor equipped with a hollow, perforated and rotatable core onto which the porous structure block or roll to be treated is fitted, said core being used to inject the treatment solutions used into the block or roll and/or to aspirate it therefrom and/or to rotate the block or roll on itself in order to homogenise the diffusion of the fluids within it and/or to expel said fluids centrifugally.

2. A device according to claim 1, wherein it includes means for carrying out the following conductive activation treatment steps on the blocks or rolls, these various steps being carried out one after the other throughout the volume of the structure to be treated and the various treatment fluids being passed through said blocks or rolls:

optional cleaning and/or rinsing of the basic structure, optional draining, wringing, centrifuging and/or drying, surface preparation pre-treatment, optional rinsing, draining, wringing, centrifuging and/or drying, deposition of a monomer, optional rinsing, draining, wringing, centrifuging and/or drying, oxidation of the monomer, leading to its polymerisation to yield an electrically conductive polymer, and doping thereof, and optional rinsing, draining, wringing, centrifuging and/or drying.

3. A device according to claim 1, wherein it includes at least one reactor equipped with a hollow, perforated and rotatable core onto which the porous structure block or roll to be treated is fitted, said core being used to inject the treatment solutions used into the block or roll and/or to aspirate it therefrom and/or to rotate the block or roll on itself in order to homogenise the diffusion of the fluids within it and/or to expel said fluids centrifugally, and flanges and a perforated rack fixed to the core contribute to supporting the block or roll around the core.

4. A device according to claim 1, wherein it includes at least one reactor equipped with a hollow, perforated and rotatable core onto which the porous structure block or roll to be treated is fitted, said core being used to inject the treatment solutions used into the block or roll and/or to aspirate it therefrom and/or to rotate the block or roll on itself in order to homogenise the diffusion of the fluids within it and/or to expel said fluids centrifugally;

flanges and a perforated rack fixed to the core contribute to supporting the block or roll around the core, and a porous material is disposed between the block or roll to be treated and the rack and/or the flanges.

5. A device according to claim 1, wherein it includes tanks for storing the solutions used for the treatment, which tanks are connected to the reactor by pipes for transferring each solution to the reactor and returning it to its specific tank.

6. A device according to claim 1, wherein it includes tanks for storing the solutions used for the treatment, which tanks are connected to the reactor by pipes for transferring each solution to the reactor and returning it to its specific tank, and some or all of the storage tanks are equipped with stirrer systems and/or temperature regulation systems and/or metering systems and/or systems for continuously or intermittently maintaining the concentrations of the solutions.

7. A device according to claim 1, wherein the fluid supply and evacuation circuits can be used for the forced passage of treatment gases or gas mixtures, and in particular for the passage of air.

8. A device according to claim 3, wherein the perforated rack and/or the flanges can be used to compress the block or roll of structure to be treated to wring it out.

9. A device according to claim 4, wherein the perforated rack and/or the flanges can be used to compress the block or roll of structure to be treated to wring it out.

* * * * *